Feb. 9, 1971     F. E. SCHRODER     3,562,083
PRESTRESSED CORRUGATED PANEL AND METHOD OF MAKING SAME
Filed Feb. 9, 1968     3 Sheets-Sheet 1
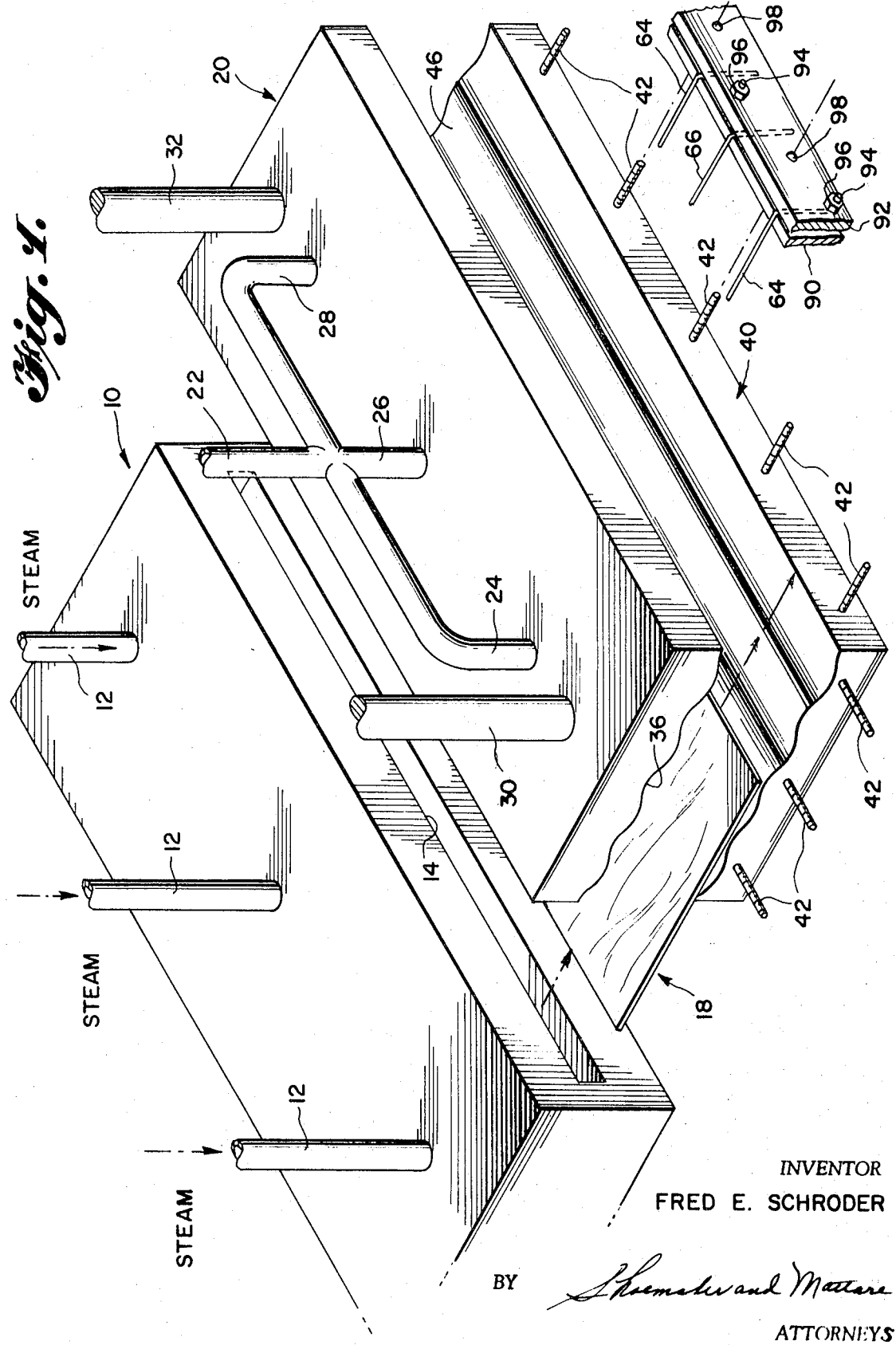
INVENTOR
FRED E. SCHRODER
BY *Shoemaker and Mattare*
ATTORNEYS

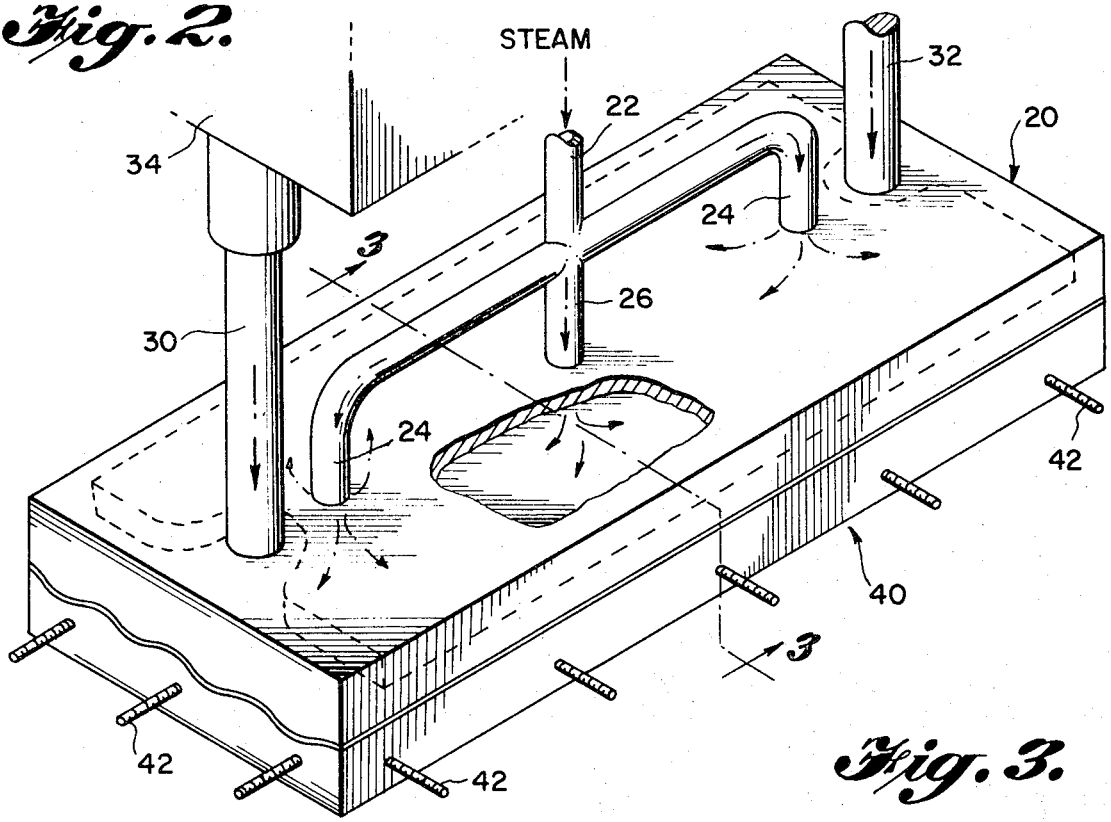
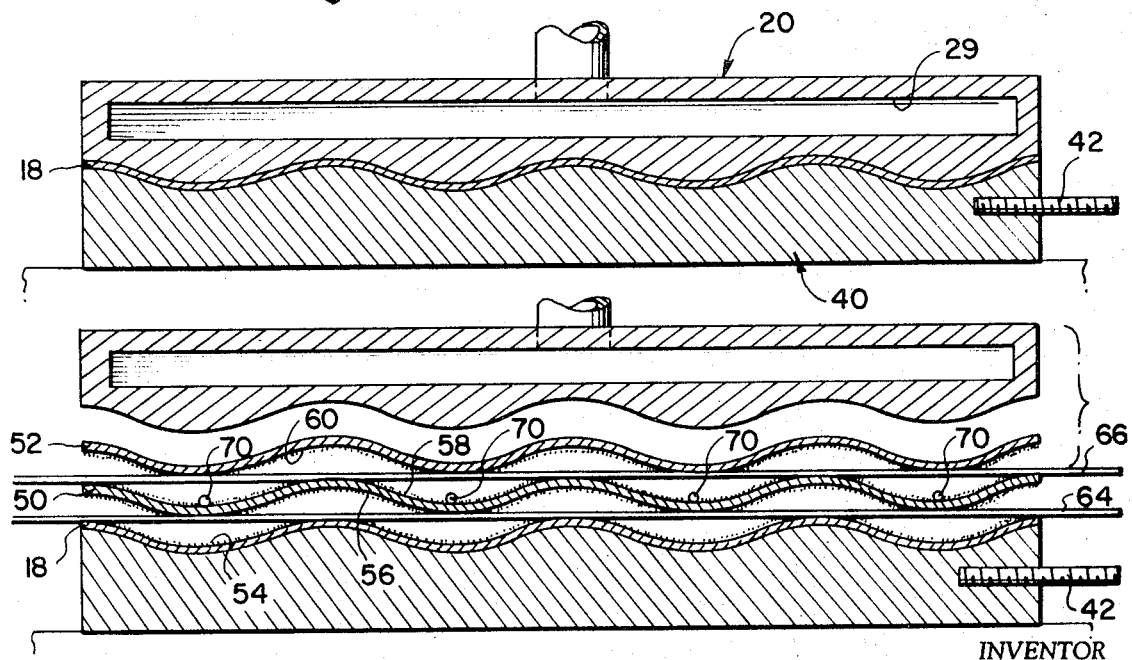

Feb. 9, 1971 F. E. SCHRODER 3,562,083
PRESTRESSED CORRUGATED PANEL AND METHOD OF MAKING SAME
Filed Feb. 9, 1968 3 Sheets-Sheet 3
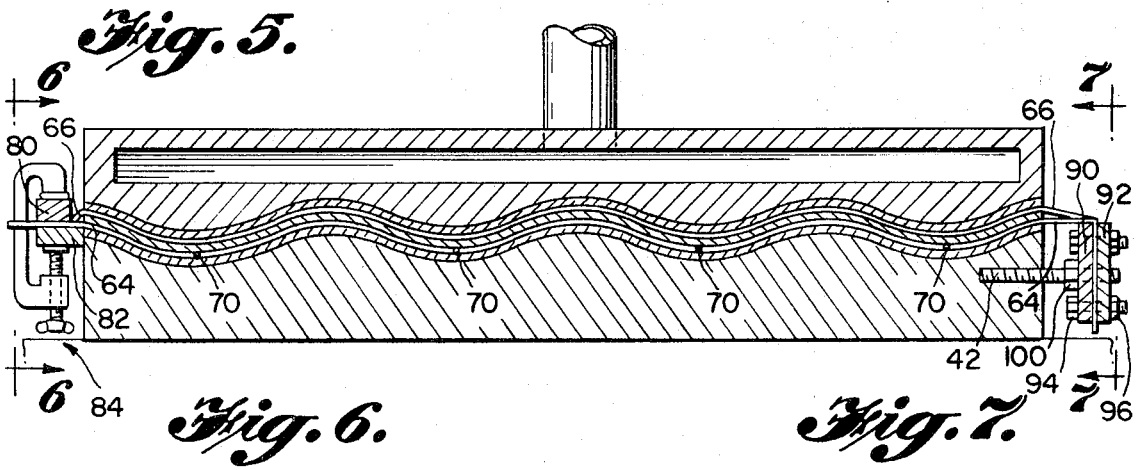
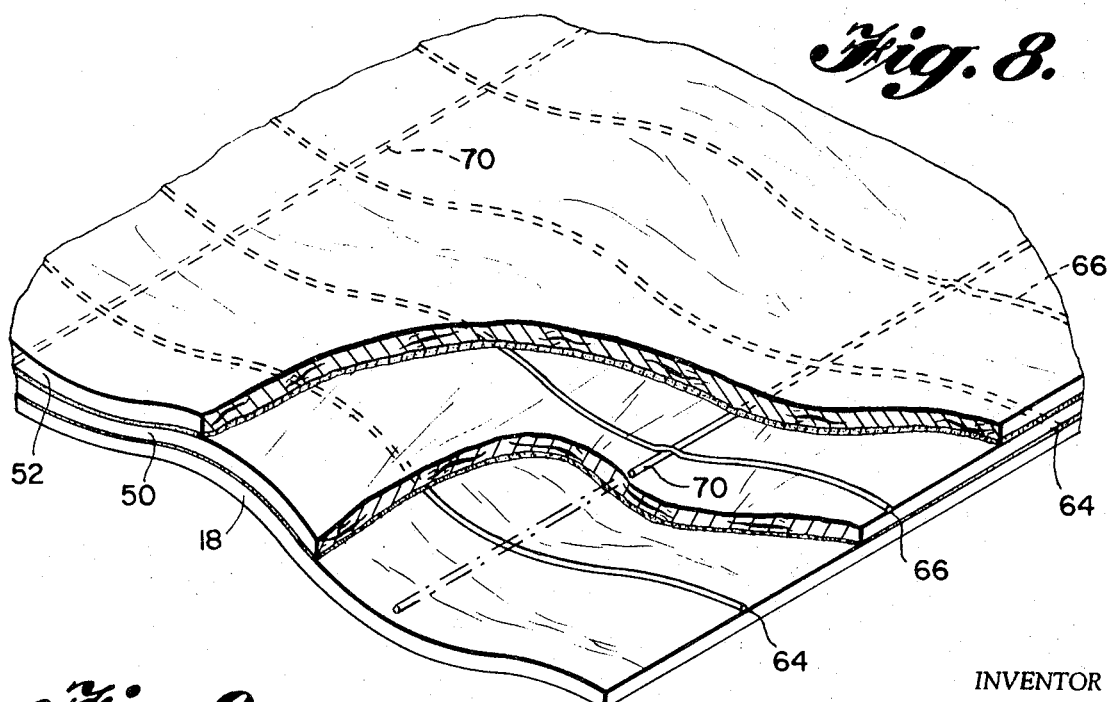
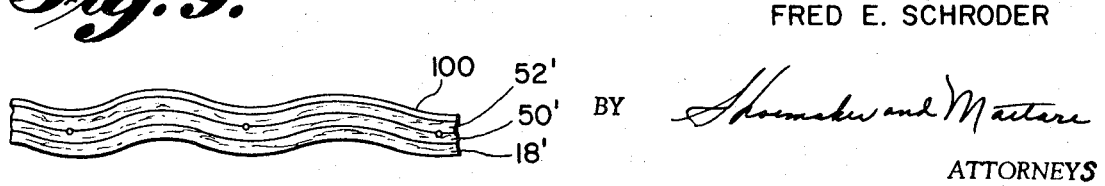
INVENTOR
FRED E. SCHRODER
BY Shoemaker and Mattare
ATTORNEYS 3,562,083
PRESTRESSED CORRUGATED PANEL AND
METHOD OF MAKING SAME
Fred E. Schroder, 130 Capers St.,
Greenville, S.C. 29605
Filed Feb. 9, 1968, Ser. No. 704,405
Int. Cl. B32b 3/28, 5/12
U.S. Cl. 161—56                                                16 Claims

ABSTRACT OF THE DISCLOSURE

A plurality of layers of plywood ar provided with the grain of adjacent layers being substantially perpendicular to one another. The overall structure is corrugated. A plurality of prestressed members are provided extending in mutually perpendicular directions, these prestressed members being sandwiched between the layers of plywood. The entire assembly is bonded together to provide a prestressed panel.

BACKGROUND OF THE INVENTION

The present invention relates to panels which may be employed in various applications which require structural members of considerable strength. The panel may for example be utilized as a building panel to form partitions or the roof of a conventional building of any type. For example, the corrugated panel may be employed to form the roof of an outdoor patio. Additionally, the panel of the present invention is particularly adapted for use in containers or pallet constructions.

Corrugated plywood constructions have been provided in the prior art, but these constructions have not proved satisfactory since the overall panel or similar arrangement will not adequately retain the corrugated configuration thereof over extended periods of time. In other words, the corrugated panel tends to have the corrugations thereof flattened out in use which of course substantially reduces the desired characteristics of the panel.

The methods employed for making corrugated panels in the prior art have been relatively complicated and have been difficult to carry out even by skilled personnel without damaging or otherwise injuring the finished panel.

SUMMARY OF THE INVENTION

In the arrangement of the present invention, a plurality of layers of plywood are corrugated. Between these layers of plywood are disposed a plurality of separate prestressing members which are placed under tension during the manufacture of the panel so that the finished panel is of a prestressed construction. This overall arrangement enables the finished panel to retain the desired configuration and characteristics even when utilized for extended periods of time and when placed under considerable loads.

In a modified form of the invention, an additional layer of material may be incorporated in the finished construction, this layer of material comprising a suitable insulating substance such as aluminum or the like so that the finished panel will have heat insulating characteristics.

The method of making the panel according to the present invention is relatively simple and can be carried out even by unskilled personnel in a foolproof manner so that the finished panels can be effectively made without breaking or damaging the panel.

BRIEF DESCRIPTION OF THE DRAWINGS

FIG. 1 is a top perspective view illustrating the first steps involved in the method of the present invention;

FIG. 2 is a top perspective view partly broken away illustrating a further step in the method of the present invention;

FIG. 3 is a sectional view taken substantially along line 3—3 of FIG. 2 looking in the direction of the arrows;

FIG. 4 is a sectional view similar to FIG. 3 illustrating the further step in the method of the present invention;

FIG. 5 is a sectional view similar to FIG. 4 illustrating a still further step in the method of the present invention;

FIG. 6 is a view taken substantially along line 6—6 of FIG. 5 looking in the direction of the arrows;

FIG. 7 is a view taken substantially along line 7—7 of FIG. 5 looking in the direction of the arrows;

FIG. 8 is a top perspective view partly broken away of a corner portion of a finished panel according to the present invention; and FIG. 9 is an end view of a completed panel according to a modified form of the invention.

DESCRIPTION OF THE PREFERRED EMBODIMENTS

Referring now to the drawings wherein like reference characters designate corresponding parts throughout the several views, as seen in FIG. 1, a presteaming means is indicated generally by reference numeral 10, this means comprising an enlarged body having a chamber formed therewithin for receiving a sheet of plywood. Steam is introduced into the chamber within means 10 by a plurality of hollow pipes 12. An opening 14 is provided in the side of means 10 through which a sheet of plywood 18 is adapted to be removed after being initially presteamed. This presteaming step in the method of making the panel of the present invention initially serves to make the sheets of plywood or similar material sufficiently pliable so that they may be readily formed into a corrugated configuration. It should of course be understood that each of the individual sheets of plywood of the present invention is preferably initially presteamed as indicated in FIG. 1.

An upper press member 20 is connected with a steam pipe 22 which in turn has three branch portions 24, 26 and 28 communicating with various spaced portions of an enlarged cavity 29 formed in the upper press member as seen most clearly in FIG. 3. While the steam pipe portions are illustrated as being connected with the upper surface of press member 20, these pipe portions may also be connected with the side surfaces of member 20 if so desired. Rods 30 and 32 fixedly secured to the upper press member are in turn connected with a movable portion 34 of the press as seen in FIG. 2 so that the upper press member can be moved up and down as necessary in carrying out the method of the present invention.

The undersurface 36 of the upper press member 20 is of a corrugated shape for producing a corresponding shape in a piece of plywood placed between the members of the press.

A lower press member 40 is secured to the associated press immediately below the upper press member 20. This lower press member 40 has a plurality of attaching studs 42 extending laterally therefrom and having threads formed thereon for a purpose hereinafter described. These attaching studs extend in generally spaced parallel relationship with one another from one side of the lower press member and from one end thereof as illustrated. Any suitable number of these attaching studs may be provided, and the number shown is purely for the purpose of illustration.

The upper surface 46 of the lower press member is also of a corrugated configuration and is complementary to the configuration of the undersurface 36 of the upper press member so that the two corrugated portions of the upper and lower press members cooperate to form corrugations in the associated plywood layers inserted therebetween.

Referring now to FIG. 3 of the drawings, the layer of plywood 18 previously described is placed between the upper and lower members of the press, and the upper member is then lowered into the operative position shown in this figure so as to form the corrugations illustrated in the layer of plywood 18. The press members are retained in this operative relationship for a sufficient period of time so that the corrugations in the layer of plywood 18 will be relatively permanently formed therein, and the layer will retain this configuration when removed from the press. Steam may be admitted to the chamber 29 of the upper press member so as to heat this press member thereby facilitating any drying of the layer of plywood which is desirable.

After carrying out the steps shown in FIG. 3, a further pair of layers of plywood are similarly inserted between the press member so as to form corrugations therebetween.

The next step in the invention is illustrated in FIG. 4. A plurality of prestressing members are provided, and these prestressing members are of elongated resilient construction so that they can be placed under tension. Typically, elongated wires will be employed, although it is also possible to utilize other prestressing members such as cord, tape and the like.

As seen in FIG. 4, the layer of plywood 18 is illustrated as being the lowermost layer, while a layer of plywood 50 is disposed thereabove, and a further layer of plywood 52 is disposed above layer of plywood 50 whereby the layer of plywood 50 is sandwiched between the two adjacent layers of plywood 18 and 52.

Suitable bonding means is placed on one or more of the facing layers of plywood to hold the overall assembly in its finished form. In a typical example, the bonding means may comprise any suitable adhesive substance such as marine glue and the like.

As illustrated, a first layer of adhesive substance 54 is placed on the upper surface of the layer of plywood 18. Similar layers of adhesive substance 56 and 58 are placed on the undersurface and top surface of the intermediate layer of plywood 50, and still another layer of adhesive substance 60 is placed on the undersurface of the uppermost layer of plywood 52.

It should be understood that if so desired, one of the layers of adhesive substance 54 or 56 may be eliminated since only one of these layers is necessary for securing layers of plywood 18 and 50 together. Similarly, one of the layers of adhesive substance 58 or 60 may be eliminated since here again only one of these layers is necessary for securing the layers of plywood 50 and 52 to one another. However, it is considered preferable to provide the various layers of adhesive substance as illustrated so as to ensure an effective bond between the adjacent layers of plywood.

As seen most clearly in FIGS. 4 and 8, a first plurality of spaced generally parallel wires 64 are disposed between the layers of plywood 18 and 50, these elongated prestressing members extending generally perpendicular to the corrugations formed in the associated layers of plywood.

A second plurality of spaced generally parallel wires 66 are disposed between the layers of plywood 50 and 52, wires 66 also extending substantially perpendicular to the corrugations formed in the associated layers of plywood. The wires 66 are staggered with respect to the wires 64 so that the wires 66 are disposed substantially equidistantly between adjacent wires 64 as seen particularly in FIG. 8.

It is also a significant feature of the present invention that the grains of adjacent layers of plywood extend substantially perpendicular to one another. As illustrated, the grain of the layers of plywood 18 and 52 extends laterally of the panel, or generally at right angles to the corrugations formed in these layers of plywood, while the grain of the intermediate layer of plywood 50 extends longitudinally of the panel, or in other words, generally parallel with the corrugations formed in layer of plywood 50.

The prestressing means also includes a further plurality of wires 70, these wires extending in substantially parallel spaced relationship with one another and are so oriented as to extend substantially parallel with the corrugations formed in the various layers of plywood. The wires 70 as seen most clearly in FIG. 4 may for example lie in the lower part of the corrugations formed in the upper surface of intermediate layer of plywood 50. The prestressing members 70 of course also lie at substantially right angles to the prestressing members 64 and 66 previously described.

After the components have been assembled as illustrated in FIG. 4, the upper press member 20 is lowered so as to press the various components together and to hold the parts in the assembled relationship illustrated, but the upper press member 20 is not lowered to its full extent at this stage of the method of the present invention.

After the upper press member 20 has been initially lowered to hold the components, tension is applied to the various prestressing wires. This is accomplished as illustrated particularly in FIGS. 5-7.

In one side of the press members 20 and 40, a first elongated block 80 is provided and a second separate elongated block 82 is provided, these two blocks being formed for example of wood or the like. A plurality of spaced clamping means in the form of C-clamps 84 or the like are provided for clamping the two blocks of wood 80 and 82 together to hold one end of the various wires 64 and 66 rigidly therebetween, block 82 abutting the lower press member 40 so as to hold the ends of the wires in the operative relationship shown in FIG. 5.

At the opposite side of the press members, a pair of elongated blocks 90 and 92 formed of wood or the like are provided, the wires 64 and 66 being received between these blocks as seen most clearly in FIG. 1. The wires are clamped in place between these blocks 90 and 92 by means of a plurality of spaced bolts 94 extending through aligned holes provided in the blocks and having nuts 96 threaded thereon whereby the ends of the wires are tightly held between the blocks.

Aligned holes 98 are provided through the blocks 90 and 92, two of these aligned holes being visible in FIG. 1. As seen in FIG. 5, each of the attaching studs 42 extends through the aligned holes 98 formed in the blocks, and a nut 100 is threaded on the studs 42 inwardly of the block 90. Accordingly, when it is desired to apply tension to the wires 64 and 66, nuts 100 are run out along the studs 42 so as to move the attached blocks 90 and 92 to the right as seen in FIG. 5 thereby applying tension to the wires 64 and 66 to produce prestressing thereof.

As illustrated in FIG. 5, after the upper press member has been moved downwardly to clamp the components therebetween as illustrated, the wires 64 and 66 are suitably prestressed. The longitudinal wires 70 are similarly prestressed by employing suitable clamping blocks therewith as discussed in connection with wires 64 and 66.

After the various prestressing members have been tensioned as described above, the upper press member 20 is then moved down even further so as to add additional tension to the prestressing members.

The overall assembly is then allowed to remain in the press until it is adequately dried so that the bonding means will hold the assembled panel in operative relationship. The drying process may be speeded up by admitting steam to the cavity 29 of the upper press member.

After the panel has been dried as discussed above, it is removed from the press, and the ends of the wires which project beyond the edges of the completed panel are trimmed off to provide the finished prestressed corrugated panel.

It should be noted that the longitudinally extending prestressing members 70 are adapted to produce a camber in the finished panel which gives additional strength to the panel.

Either of the outer layers of plywood 18 or 50 may be suitably colored so as to provide the desired finished appearance to the panel thereby enhancing the utilization thereof as a building unit.

Referring now to FIG. 9 of the drawing, a modified form of the invention is illustrated wherein the lower portion of the panel is identical with that previously described, and similar components have been given the same reference numerals primed. In this form of the invention, an additional layer of material 100 is secured to the upwardly facing surface of the panel as seen in this figure. This layer of material may comprise a suitable thermal insulating means such as aluminum or the like. The layer may comprise a thin sheet of aluminum foil or perhaps even a thicker layer of material in the form of a flexible sheet or the like.

This layer of material 100 is secured by suitable bonding means to the adjacent layer of plywood, and when making the finished panel, this layer of material 100 is simply added to the assembly of components as illustrated for example in FIG. 3 with a layer of suitable adhesive material between layer of material 100 and the upper layer of plywood 52. The method is then carried out in the same manner as aforedescribed so as to provide the finished assembly.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A prestressed corrugated panel comprising a plurality of layers of precorrugated plywood disposed adjacent one another, means for holding the layers of precorrugated plywood in assembled relationship with respect to one another with the corrugations in one layer complementary to the corrugations in the other layer, and prestressing means comprising a plurality of spaced prestressed strands of material disposed adjacent at least one of said layers of plywood with at least some of said prestressing means disposed parallel to and in the concavity of at least some of said corrugations for prestressing said panel and maintaining the shape of said corrugations.

2. A panel as defined in claim 1 wherein said plurality of layers of plywood comprise at least three in number with at least one layer of plywood sandwiched between the adjacent two layers of plywood, said one layer of plywood having a grain extending in one direction, said other two layers of plywood having the grain thereof extending at substantially right angles to the grain of said one layer of plywood.

3. A panel as defined in claim 1 wherein said prestressing means is resilient.

4. A panel as defined in claim 1 wherein said prestressing means are disposed between said layers of plywood and are bonded thereto.

5. A panel as defined in claim 1 wherein said prestressing means comprises a first plurality of generally parallel spaced separate members disposed between two adjacent layers of plywood and extending in one direction.

6. A panel as defined in claim 5 wherein said prestressing means also includes a second plurality of generally parallel spaced separate members disposed between a pair of adjacent layers of plywood, said second plurality of members being spaced from said first plurality of members.

7. A panel as defined in claim 6 wherein said second plurality of members are disposed in staggered relationship to said first plurality of members.

8. A panel as defined in claim 1 wherein said prestressing means are disposed between a pair of adjacent layers of plywood, said members extending substantially parallel with said corrugations.

9. A panel as defined in claim 1 wherein said layers of plywood are at least three in number including a first layer sandwiched between a pair of adjacent layers, the grain of said first layer extending at substantially right angles to the grain of said pair of adjacent layers, said prestressing means comprising a first plurality of generally parallel spaced separate members extending between an adjacent pair of layers of plywood and at generally right angles to said corrugations, said prestressing means including a second plurality of generally parallel spaced separate members disposed between a pair of adjacent layers of plywood and extending at substantially right angles to said corrugations, said prestressing means also including a third plurality of generally parallel spaced separate members disposed between an adjacent pair of layers of plywood, said third plurality of members extending generally parallel with said corrugations and at substantially right angles to said first and second plurality of members.

10. A panel as defined in claim 1 including an additional layer of thermal insulating material secured to an outer surface of said panel.

11. The method of making a prestressed corrugated panel comprising providing a plurality of layers of plywood and forming complementary corrugations therein, inserting prestressing means between said layers of plywood, placing bonding means between said layers of material and forcing said layers of plywood toward one another, tensioning said prestressing means so as to prestress the entire panel, and allowing the bonding means to dry and hold the panel in finished assembled relationship.

12. The method as defined in claim 11 including the step of initially presteaming said layers of plywood to make them pliable.

13. The method as defined in claim 11 wherein the step of placing bonding means between said layers of plywood comprises providing an adhesive material on at least one of two adjacent facing surfaces of adjacent layers of plywood.

14. The method as defined in claim 11 wherein the step of inserting prestressing means between said layers of plywood comprises inserting a plurality of elongated resilient separate members in spaced parallel relationship with one another and extending generally perpendicularly to said corrugations.

15. The method as defined in claim 14 including the additional step of inserting a further plurality of elongated resilient separate members in spaced parallel relationship with one another and extending substantially parallel with said corrugations.

16. The method as defined in claim 11 wherein said layers of plywood are placed in a press and the press is actuated to force said layers of plywood toward one another, whereupon tension is applied to said prestressing means, and then subsequently actuating the press farther to add additional tension to said prestressing means.

References Cited

UNITED STATES PATENTS

| | | | |
|---|---|---|---|
| 1,195,950 | 8/1916 | Carney | 161—58 |
| 1,334,796 | 3/1920 | Robinson | 161—56 |
| 1,427,812 | 9/1922 | Hirt | 161—56 |
| 2,091,918 | 8/1937 | Finck | 161—136X |
| 2,428,325 | 9/1947 | Collins | 161—58X |
| 3,003,204 | 10/1961 | Bryant | 161—Corrugate |

FOREIGN PATENTS 669,089  8/1963  Canada _____ 161—56

HAROLD ANSHER, Primary Examiner

R. A. KILLWORTH, Assistant Examiner

U.S. Cl. X.R.

156—161, 210; 161—58, 60, 135